US008078098B2

(12) United States Patent
Huang et al.

(10) Patent No.: US 8,078,098 B2
(45) Date of Patent: Dec. 13, 2011

(54) MULTI-PATH DATA DISSEMINATION METHOD FOR MAGNETIC DIFFUSION WIRELESS NETWORK AND SYSTEM THEREOF

(75) Inventors: Polly Huang, Taipei (TW); Tsung-Han Lin, Taipei (TW); Shu-Yu Hu, Taipei (TW); Ting-Hao Chang, Taipei County (TW); Shin-Lung Huang, Taoyuan County (TW); I-Hei Wu, Tainan County (TW); Seng-Yong Lau, Taipei County (TW)

(73) Assignee: National Taiwan University, Taipei (TW)

( * ) Notice: Subject to any disclaimer, the term of this patent is extended or adjusted under 35 U.S.C. 154(b) by 295 days.

(21) Appl. No.: 12/608,883

(22) Filed: Oct. 29, 2009

(65) Prior Publication Data

US 2010/0304662 A1 Dec. 2, 2010

(30) Foreign Application Priority Data

Jun. 2, 2009 (TW) .............................. 98118226 A

(51) Int. Cl.
*H04Q 7/20* (2006.01)

(52) U.S. Cl. .......... 455/7; 455/11.1; 455/15; 455/426.1; 455/445; 455/515; 370/315; 370/310; 370/408; 370/407; 370/406; 324/200; 324/207.13; 324/207.14; 324/207.15; 324/207.16

(58) Field of Classification Search ................ 455/7.11, 455/1.15, 18, 24, 67.11, 426.1, 426.2, 403, 455/422.1, 445, 41.1, 513, 500, 517, 509, 455/515, 516; 370/315, 310, 328, 329, 343, 370/338, 405, 408, 409, 406, 492, 501; 324/200, 324/207.13, 207.14, 207.15, 207.16, 207.22, 324/219

See application file for complete search history.

(56) References Cited

U.S. PATENT DOCUMENTS

2007/0050240 A1 * 3/2007 Belani et al. .................... 705/13
2008/0306358 A1 * 12/2008 Minai ........................... 600/302

* cited by examiner

*Primary Examiner* — Keith Ferguson
(74) *Attorney, Agent, or Firm* — WPAT, P.C.; Anthony King

(57) ABSTRACT

A multi-path data dissemination method for a magnetic diffusion wireless network and a system thereof overcome environmental interferences in wireless data transmissions. Each node of the network is provided for figuring out its good neighbors by broadcasting a good-neighbor exploratory message in a bootstrap process. Each node keeps a good-neighbor table containing nodes with a RSSI higher than a threshold of the good-neighbor table. A magnetic field of a magnetic diffusion (MD) dissemination method capable of determining a data dissemination path is created according to the good-neighbor tables to ensure that the data can be forwarded to a data sink successfully.

5 Claims, 6 Drawing Sheets

MULTI-PATH DATA DISSEMINATION METHOD FOR MAGNETIC DIFFUSION WIRELESS NETWORK AND SYSTEM THEREOF

CROSS-REFERENCE TO RELATED APPLICATIONS

This non-provisional application claims priority under 35 U.S.C. §119(a) on Patent Application No(s). 098118226 filed in Taiwan, R.O.C. on 2 Jun. 2009, the entire contents of which are hereby incorporated by reference.

FIELD OF THE INVENTION

The present invention relates to a wireless data dissemination method and a system thereof, in particular to a multi-path data dissemination method for a magnetic diffusion wireless network and a system thereof.

BACKGROUND OF THE INVENTION

As science and technology advance rapidly, small and reliable sensors are used extensively in our living environments for transmitting various parameters of our environment such as an automatic detection of room temperature capable of fine tuning an air conditioning system can produce just enough cold air, or an automatic detection of abnormal heartbeat can avoid unrecoverable injuries caused by arrhythmias of a cardiac patient. Therefore, a timely, accurate and reliable data transmission and a high-efficiency energy source become increasingly important.

A magnetic diffusion (MD) data dissemination mechanism is developed from magnetic physical characteristics. Magnetic diffusion is a simple data dissemination mechanism for ensuring the timeliness and reliability of the data dissemination and provides a high efficiency of using an energy source, and whose principle is mainly based on the force interaction of magnets in the nature, wherein a data sink acts as a magnet, and data are like nails attracted by the data sink, and it is similar to the situation of having nails attracted by the magnets in the direction of a magnetic field. The magnetic field is created by setting an appropriate quantity of magnetic charges for each sensing node within a magnetic range of the data sink. The quantity of magnetic charges depends on a hop distance of the data sink and the resources provided by the data sink. After the magnetic field is created, data will be transmitted from a node with more magnetic charges to a node with less magnetic charges.

With reference to FIGS. 1 and 2 for schematic views of a data dissemination method of a conventional magnetic diffusion mechanism respectively, the magnetic diffusion dissemination mechanism needs to create a magnetic field before a data dissemination takes place, and nodes having different quantities of magnetic charges and a data sink are included within the magnetic field. In FIG. 1, a data sink 101 in a magnetic field 100 sets a maximum quantity of magnetic charges (such as 8). An interest message including the quantity of magnetic charges and the data sink 101 and a mode of the interest message are broadcasted periodically to a neighbor (which is a node), when a node receives an interest message for first time, and an item of the interest message will be produced and stored. The node will decrement the quantity of magnetic charges of the received interest message by 1, and the data type and the magnetic charges are recorded into the item, and the interest message is transmitted to the neighbor.

For every time of hopping a hop distance to a next node, the quantity of magnetic charges will be decremented by 1, and the same hop distance from the data sink 101 includes the same quantity of magnetic charges. If a node has received an interest message to produce an item and also received an interest message from another node, the node will compare the quantity of magnetic charges minus 1 included in the interest message with the quantity of magnetic charges in the item. If the quantity of magnetic charges included in the interest message after the decrement is still greater than the quantity of magnetic charges in the item, then the node will update the quantity of magnetic charges in the item as the numeric value minus 1 in the interest message, and transmit the interest message to its neighbor. If the quantity of magnetic charges included in the interest message after the decrement is smaller than the quantity of magnetic charges in the item, then the node will know that the interest message is not transmitted from a node close to the data sink 101 and will discard the interest message.

The magnetic field is created after the quantity of magnetic charges for each node is set according to the aforementioned sequence. The quantity of magnetic charges decreased from the data sink 101 to a plurality of sources A~D guides the data to flow in an opposite direction, similar to the situation of a nail being attracted from a position with less magnetic charges towards a position with more magnetic charges in a magnetic field, and data are transmitted from a node with less magnetic charges to a node with more magnetic charges in the magnetic field.

In FIG. 1, nodes A and B have a hop distance from the data sink 101, and thus the quantity of magnetic charges is decremented by 1 to 7. Nodes C and D have the same quantity of magnetic charges which is equal to 6.

With reference to FIG. 2, the data sink 101 periodically broadcasts an interest message to each node, and the interest message specifically points out the data which is interested to the data sink 101 and possesses a data source node C in compliance with the interest message for selecting the shortest delay path from a multiple of paths according to the magnetic diffusion dissemination mechanism, and broadcasting the data to the data sink 101. With reference to FIG. 2, data 105 are disseminated from a data provider 103 to the data sink 101 along the path from the node C to a node with a large number of magnetic charges. The magnetic diffusion dissemination mechanism selects the shortest delay path, and thus a node A instead of a node B having the same quantity of magnetic charges hops a hop distance to reach the data sink 101.

However, the data dissemination of a wireless network is asymmetrical, meaning that valid data disseminations in a direction does not necessarily implies valid data disseminations in the opposite direction. With reference to FIG. 3 for a schematic view of a data dissemination with a data loss occurred in an asymmetrical wireless network for a conventional magnetic diffusion mechanism, if it is necessary to disseminate data 105 back through the node B, the node having a quantity of magnetic charges equal to 7 will transmit signals in all directions, such that the node having a quantity of magnetic charges equal to 8 (which is the data sink 101) will receive the signal. Due to the asymmetry of the wireless network, the node B is unable to return the data 105 to the data sink 101, and thus the node B is hindered from returning the data to the data sink 101 in a direction along the incremented magnetic charges, although the node B can complete setting the magnetic charges. Consequently, unreliable transmissions will result, and the way of looking for other nodes to disseminate data will cause a low using efficiency of energy sources.

SUMMARY OF THE INVENTION

Therefore, it is a primary objective of the present invention to provide a multi-path data dissemination method for a magnetic diffusion wireless network and a system thereof and prevents a data dissemination path from having a dissemination hindrance of an asymmetrical transmission to enhance the reliability of the magnetic diffusion dissemination mechanism and assure data to be disseminated to a data sink successfully, so as to achieve a wireless dissemination mechanism with a high reliability and a high efficiency of using energy sources.

Another objective of the present invention is to explore the signal strength of each node in the magnetic field before a magnetic field of a magnetic diffusion wireless network is created, such that the signal strength can be used as a basis for establishing the rules of selecting a reliable dissemination path after the magnetic field is created.

To achieve the foregoing objectives, the present invention provides a multi-path data dissemination method for a magnetic diffusion wireless network, and the method comprises the following steps: (a) A node in a magnetic diffusion wireless network sends out a good-neighbor exploratory message; (b) If other nodes receives the good-neighbor exploratory message, each of these other nodes records the node into its own good-neighbor table; (c) The steps (a) and (b) are repeated until each node in the magnetic diffusion wireless network has transmitted the good-neighbor exploratory message and completed each one's good-neighbor table; and (d) The good-neighbor table of each node is used as a basis to create a magnetic field. If it is necessary to set the quantity of magnetic charges for any one of the neighbor nodes, the neighbor node must be listed in the good-neighbor table of any one of the nodes, or else no setup will take place, such that the magnetic field can determine a reliable data dissemination path.

In a preferred embodiment, the step (b) further comprises a step: If the good-neighbor exploratory message has a signal strength greater than a good-neighbor table threshold, the node will be recorded into each good-neighbor table of the aforementioned other nodes, wherein the good-neighbor table threshold is −85 dbm.

To achieve the foregoing objectives, the present invention provides a multi-path data dissemination system for a magnetic diffusion wireless network, and the system is applied in a magnetic field, and the magnetic field comprises: a data sink for receiving a data; and a plurality of nodes, acting as broadcast nodes of the data dissemination; wherein each of the nodes and the data sinks has a good-neighbor table, and each respective good-neighbor table records a signal strength greater than a good-neighbor table threshold of a neighbor node, and when the magnetic field is created, the good-neighbor table of each node is used as a basis to set up the quantity of magnetic charges of the neighbor node of each node, and the good-neighbor table threshold is −85 dbm.

Therefore, the multi-path data dissemination method for a magnetic diffusion wireless network and a system thereof in accordance with the present invention allows each node to keep a good-neighbor table used as a basis of creating the following magnetic field in order to overcome the dissemination hindrance of the asymmetry produced by environmental interferences of the wireless data transmission. Once a node shows up in the good-neighbor table, it means the data dissemination is successful when the node disseminates data, and there is no issue of disseminating data but having a hindrance of returning the data occurred in the conventional way of creating magnetic fields, so as to assure that the data can be transmitted to a data sink successfully.

DESCRIPTION OF THE PREFERRED EMBODIMENTS

Figure 1:
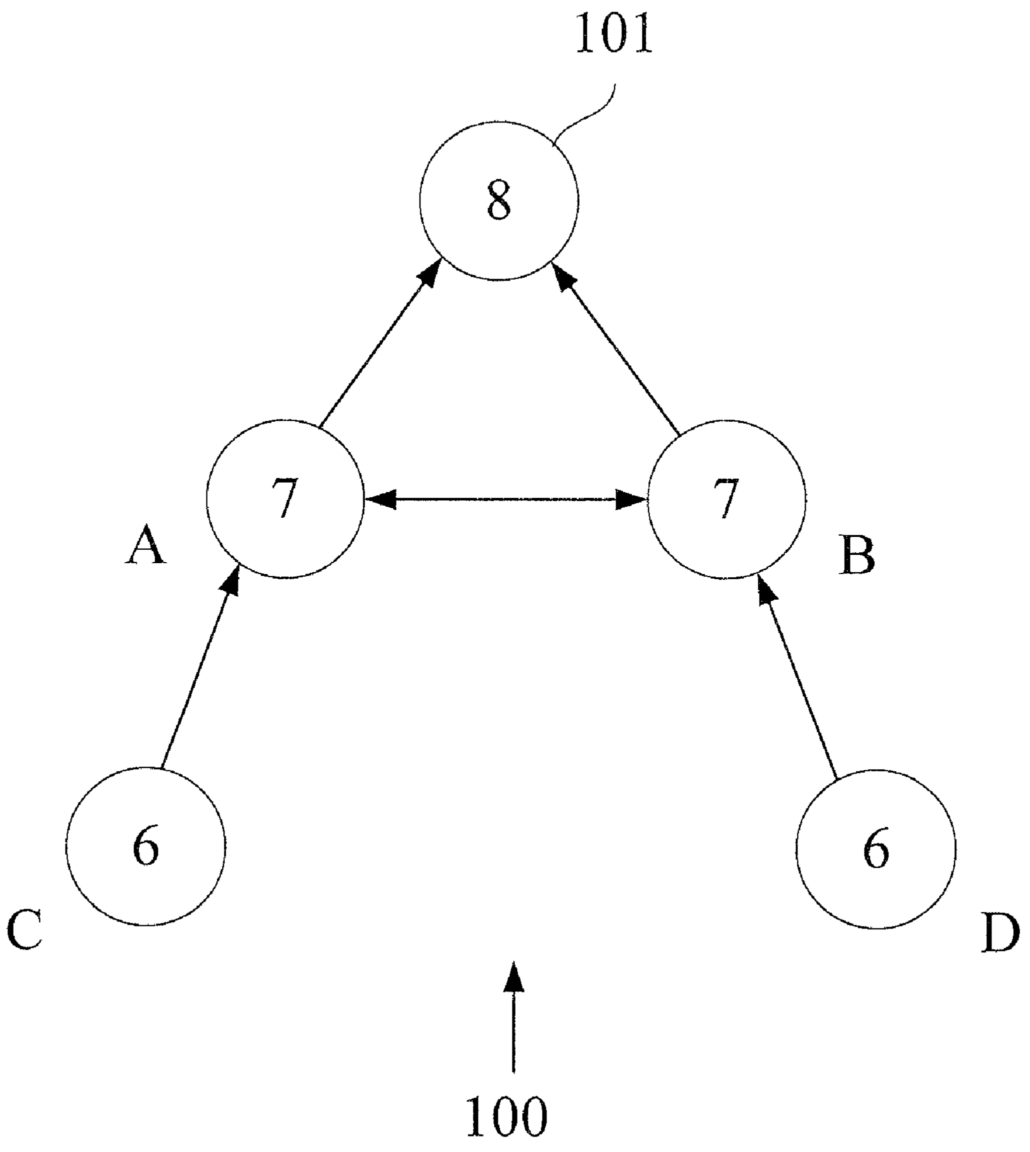
FIG.1 (Prior Art)
FIGS. 1 and 2 are schematic views of a conventional data dissemination method for a magnetic diffusion mechanism.
Figure 2:
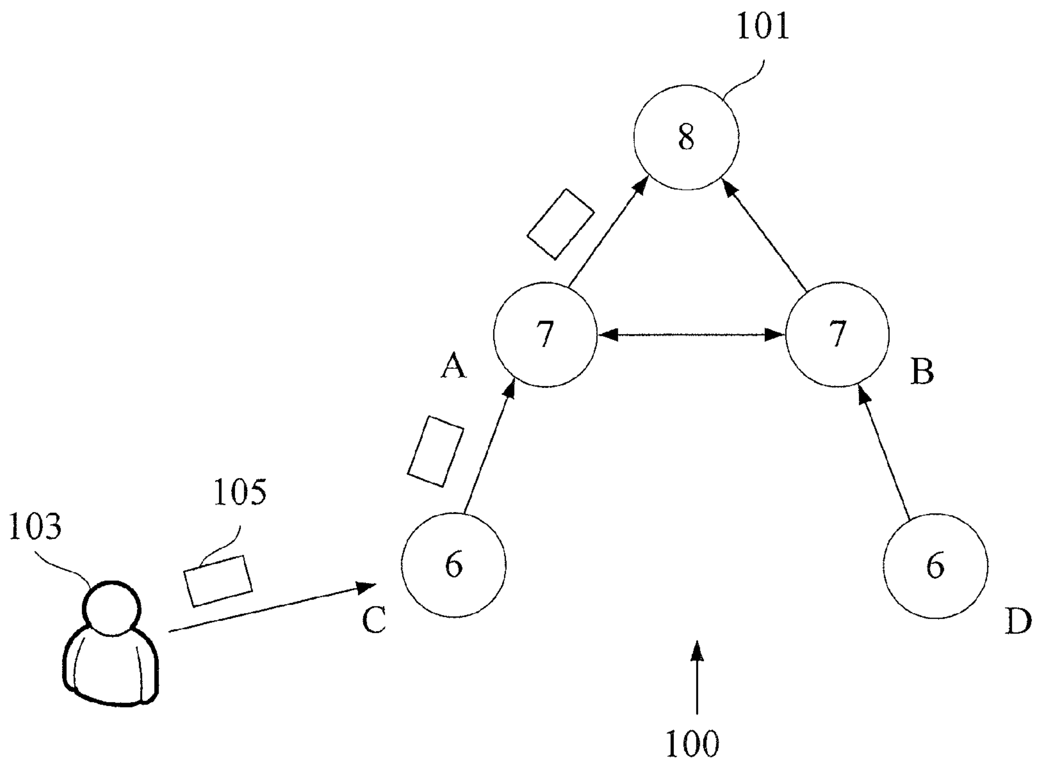
FIG.2 (Prior Art)
Figure 3:
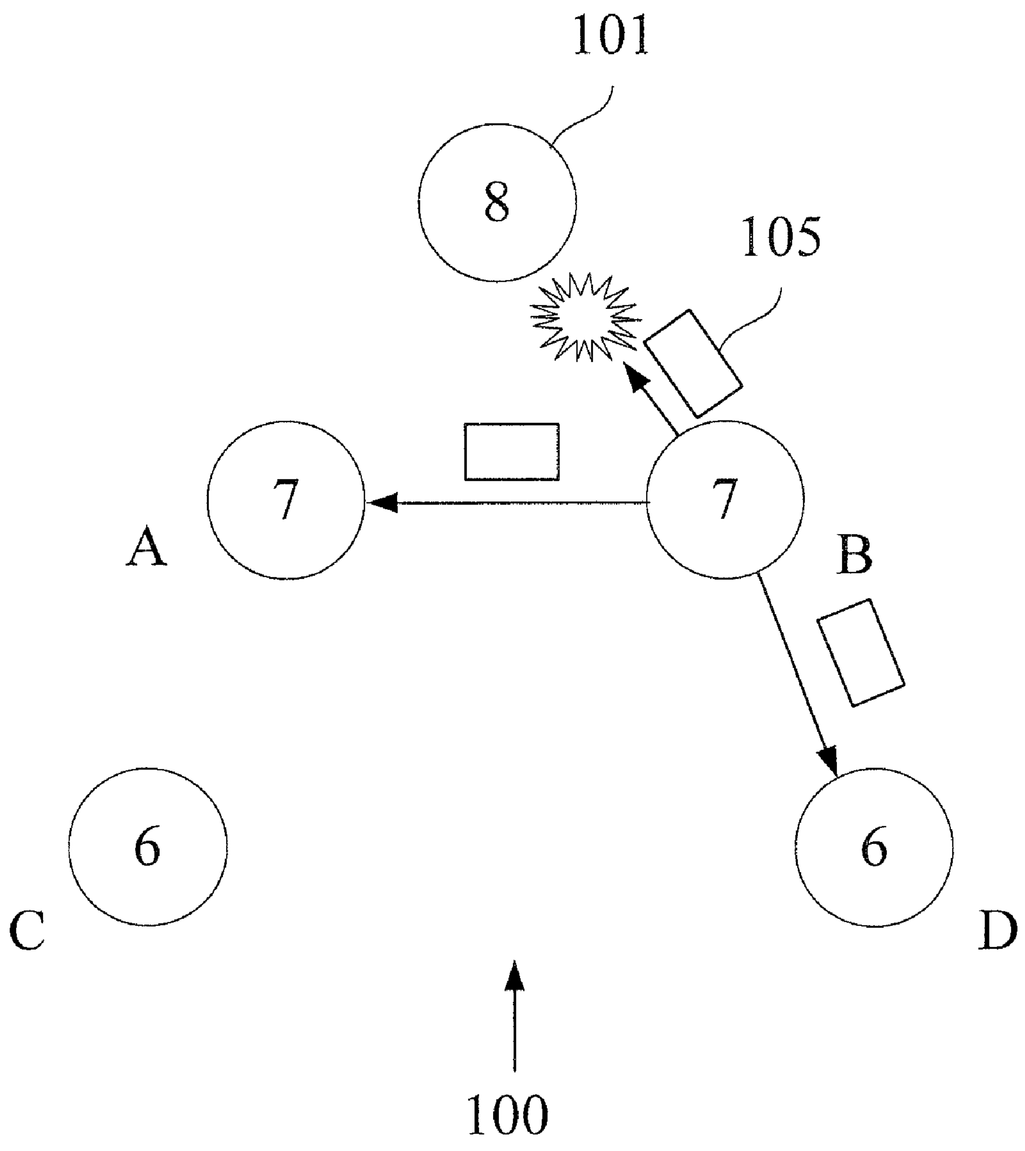
FIG.3 (Prior Art)
FIG. 3 is a schematic view of a data dissemination with a data loss occurred in an asymmetrical wireless network for a conventional magnetic diffusion mechanism.

Other features and advantages of the present invention will become apparent in the following detailed description of the preferred embodiments with reference to the accompanying drawings. Same numerals are used for same respective elements in the drawings and the preferred embodiments.

The present invention explores the signal strength of each node in the magnetic field before a magnetic field of a magnetic diffusion wireless network is created, and then uses the created magnetic field as a basis to establish rules of selecting a reliable dissemination path.

Figure 4:
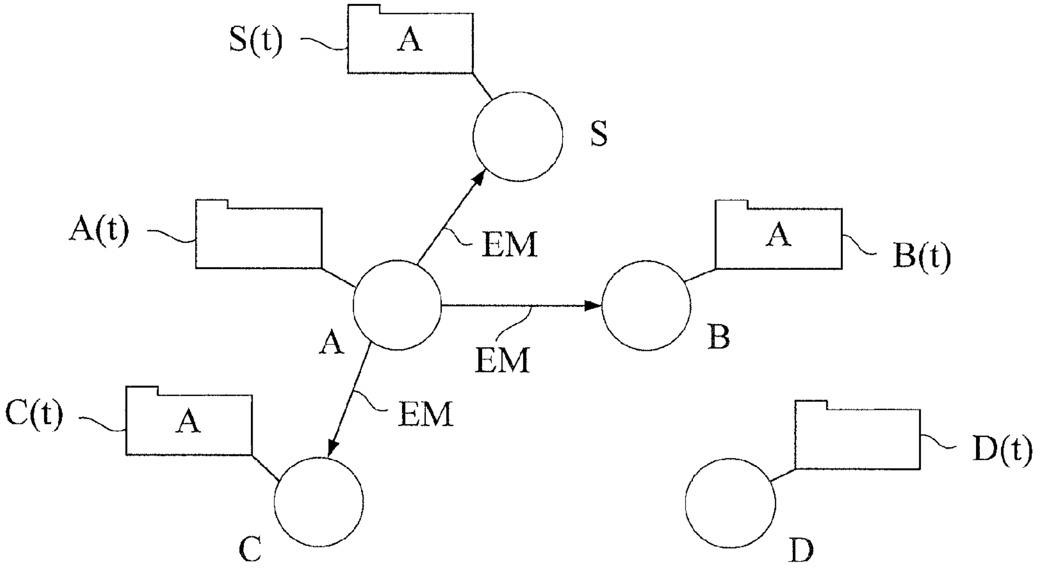
FIG. 4 is a schematic view of a good-neighbor table created before a magnetic field is formed in accordance with a preferred embodiment of the present invention.

With reference to FIG. 4 for a schematic view of a good-neighbor table created before a magnetic field is formed in accordance with a preferred embodiment of the present invention, each node of a magnetic diffusion wireless network transmits a good-neighbor exploratory message (EM) sequentially, such that when a neighbor node (neighbor) of a node sending the good-neighbor exploratory message has received the good-neighbor exploratory message, such neighbor node will record the node sending the good-neighbor exploratory message into its own good-neighbor table. To enhance the reliability of the good-neighbor table, the node sending the good-neighbor exploratory message will be recorded into each good-neighbor table of the other nodes, if the good-neighbor exploratory message has a signal strength higher than a good-neighbor table threshold. The good-neighbor table threshold is a received signal strength indication (RSSI), and if it is greater than −85 dbm, then a good signal quality will be achieved, and the node transmitting the good-neighbor exploratory message can be recorded into each good-neighbor table of the other nodes. In FIG. 4, the magnetic diffusion wireless network of this preferred embodiment comprises a data sink S and a plurality of nodes A, B, C, D, wherein the node A transmits the good-neighbor exploratory message EM into air, and the data sink S and the nodes B and C receives the good-neighbor exploratory message EM, such that the node A is recorded into each good-neighbor table S(t), B(t) and C(t).

Figure 5:
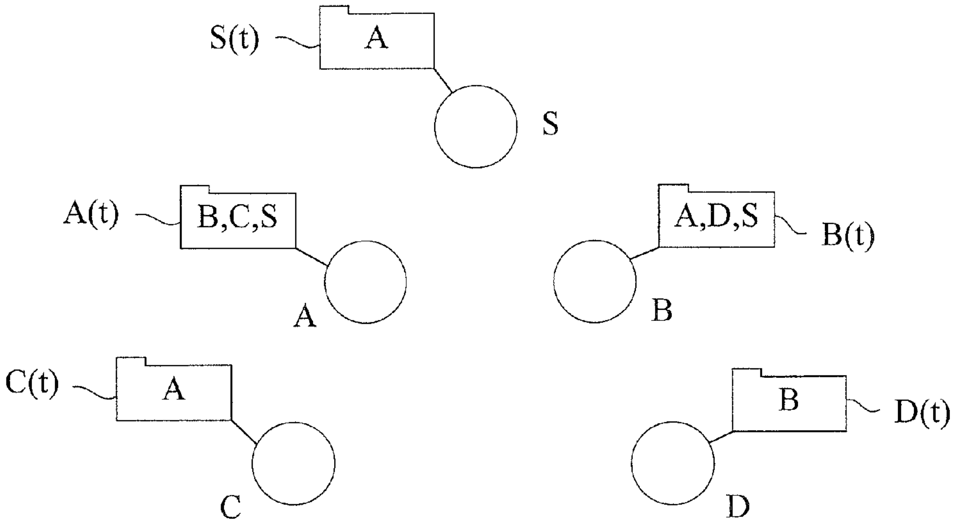
FIG. 5 is a schematic view of each node completing its good-neighbor table n accordance with a preferred embodiment of the present invention.

Each node (including the data sink S) in the magnetic diffusion wireless network has transmitted the good-neighbor exploratory message EM to complete establishing each respective good-neighbor table. With reference to FIG. 5 for a schematic view of each node completing its good-neighbor table in accordance with a preferred embodiment of the present invention, the good-neighbor table S(t) of the data sink S only includes the node A but not the node B, indicating that the node B cannot disseminate data to the data sink S normally.

Figure 6:
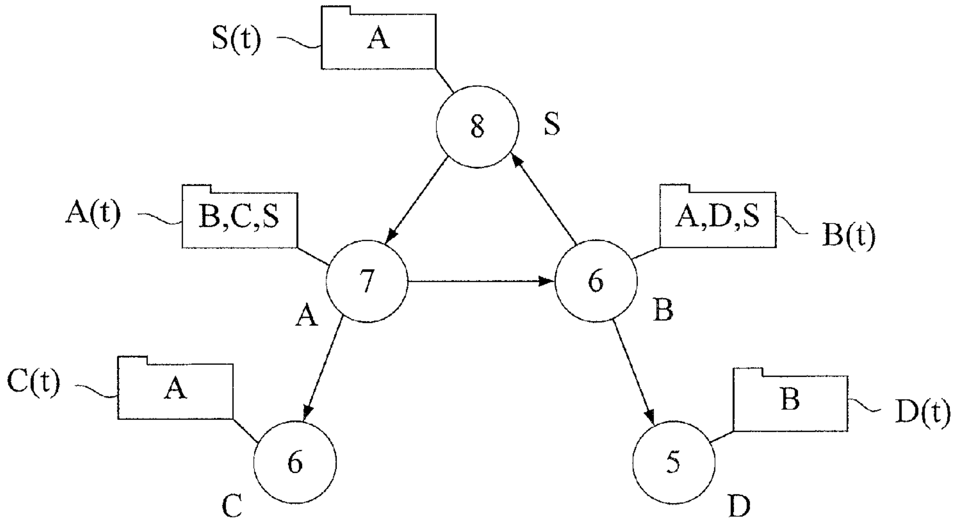
FIG. 6 is a schematic view of forming a magnetic field after a good-neighbor table of each node is completed in accordance with a preferred embodiment of the present invention.

With reference to FIG. 6 for a schematic view of forming a magnetic field after a good-neighbor table of each node is completed in accordance with a preferred embodiment of the present invention, an appropriate quantity of magnetic charges is set for each node within the magnetic field of the data sink S to create the magnetic field, after the good-neighbor table of each node has been completed. Although the node B and the data sink S only have a hop distance apart from one another, the quantity of magnetic charges of the node B according to the prior art is set to 7, but we know that the node B cannot disseminate data to the data sink S normally in the previous process of establishing the good-neighbor table. Therefore, if it is necessary to set the quantity of magnetic charges of the node B to 7 according to the prior art, a dissemination hindrance will occur when the data is disseminated to the data sink S through the node B. On the contrary, the multi-path data dissemination method of the magnetic diffusion wireless network of the present invention sets the quantity of magnetic charges of the node B to 6 to avoid the occurrence of a dissemination hindrance. When the good-neighbor table is established, the data sink S will base on its good-neighbor table S(t) to determine which node is the one to be set for the quantity of magnetic charges next, and the node A is used for illustrating the invention. In other words, the node A has the quantity of magnetic charges equal to the quantity of magnetic charges (8) of the data sink S minus 1 which is equal to 7. The good-neighbor table A(t) of the node A includes the nodes B, C, S, and thus the quantity of magnetic charges of the nodes B and node C can be set to 6. Since the data sink S has more magnetic charges than the node A, therefore the data sink S cannot be set again. Similarly, a conventional magnetic diffusion mechanism can create the magnetic field and use the good-neighbor table of the present invention to complete setting the quantity of magnetic charges for each node within the magnetic field.

Figure 7:
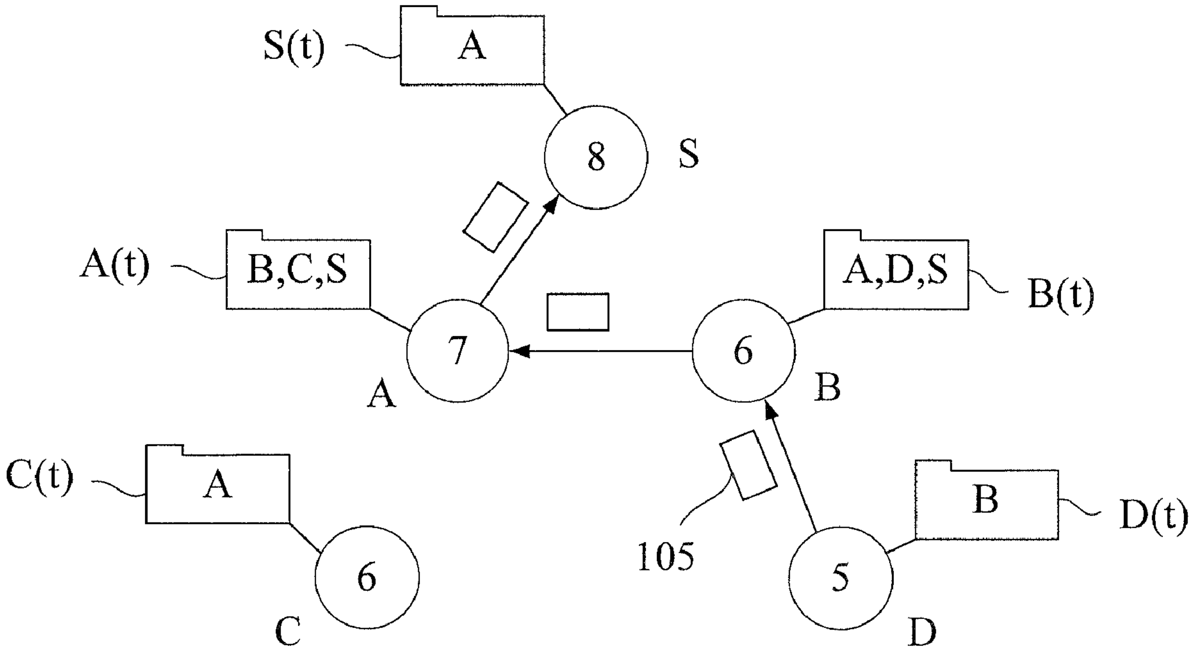
FIG. 7 is a schematic view of a multi-path data dissemination method of the present invention.

With reference to FIG. 7 for a schematic view of a multi-path data dissemination method of the present invention, after the good-neighbor table of each node (including the data sink S) in the magnetic field, data are transmitted among the nodes and returned to the data sink S along a direction of incrementing the quantity of magnetic charges. In this preferred embodiment, data are transmitted from the node D to the node B, and then to the node A, and finally reached to the data sink S. Therefore, a multi-path data dissemination method for a magnetic diffusion wireless network and a system thereof in accordance with the present invention establishes the good-neighbor table of each node to avoid any dissemination hindrance occurred when the node B disseminates data to the data sink S, so as to assure the data to be disseminated to the data sink S successfully.

While the invention has been described by means of specific preferred embodiments, numerous modifications and variations could be made thereto by those skilled in the art without departing from the scope and spirit of the invention set forth in the claims.

What is claimed is:

1. A multi-path data dissemination method for a magnetic diffusion wireless network, comprising the steps of:

(a) transmitting a good-neighbor exploratory message by a node in a magnetic diffusion wireless network;

(b) recording the node into a good-neighbor table of other nodes, if these other nodes receive the good-neighbor exploratory message;

(c) repeating steps (a) and (b) until each node in the magnetic diffusion wireless network has transmitted the good-neighbor exploratory message and completed each respective good-neighbor table; and (d) creating a magnetic field according to the good-neighbor table of each node, wherein if it is necessary to set the quantity of magnetic charges for a node adjacent to any node, the neighbor node must be listed in the good-neighbor table of such node, otherwise the quantity of magnetic charges is not set, and the magnetic field can be used for determining a reliable data dissemination path.

2. The multi-path data dissemination method for a magnetic diffusion wireless network as recited in claim 1, wherein the step (b) further comprises a step of recording the node in each good-neighbor table of the other nodes, if the good-neighbor exploratory message has a signal strength greater than a good-neighbor table threshold.

3. The multi-path data dissemination method for a magnetic diffusion wireless network as recited in claim 2, wherein the good-neighbor table threshold is equal to −85 dbm.

4. A multi-path data dissemination system for a magnetic diffusion wireless network, being applied in a magnetic field, and the magnetic field comprising:

a data sink, for receiving data; and a plurality of nodes, each acting as a broadcasting node of the data dissemination;

thereby, each of the nodes and data sinks has a good-neighbor table, and each good-neighbor table records a signal strength greater than a good-neighbor table threshold of a neighbor node, and when the magnetic field is created, the good-neighbor table of each node is used as a basis for setting a quantity of magnetic charges for the neighbor nodes of each node.

5. The multi-path data dissemination system for a magnetic diffusion wireless network as recited in claim 4, wherein the good-neighbor table threshold is equal to −85 dbm.

* * * * *